(12) United States Patent     (10) Patent No.:   US 12,676,904 B2

Llamas Virgen et al.     (45) Date of Patent:     Jul. 7, 2026

(54) CONFERENCE OPERATOR

(71) Applicant: INTERNATIONAL BUSINESS MACHINES CORPORATION, Armonk, NY (US)

(72) Inventors: Paul Llamas Virgen, Guadalajara (MX); Peeyush Jaiswal, Boca Raton, FL (US); Priyansh Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/179,702

(22) Filed: Mar. 7, 2023

(65) Prior Publication Data

US 2024/0305678 A1     Sep. 12, 2024

(51) Int. Cl.
*G06F 15/16*     (2006.01)
*H04L 65/1089*     (2022.01)
(Continued)

(52) U.S. Cl.
CPC ...... *H04L 65/4015* (2013.01); *H04L 65/1089* (2013.01); *H04L 65/403* (2013.01)

(58) Field of Classification Search
CPC ............... H04L 65/403; H04L 65/1089; H04L 65/4015
(Continued)

(56) References Cited

U.S. PATENT DOCUMENTS 7,679,638 B2 *   3/2010   Eshkoli ................. H04L 65/403
                                 348/14.07
7,679,640 B2 *   3/2010   Eshkoli ................. H04N 7/152
                                 348/14.09
(Continued)

FOREIGN PATENT DOCUMENTS

KR     20220148955 A    11/2022
WO     2021262164 A1    12/2021

OTHER PUBLICATIONS

Author Unknown, "Virtual Events Market Size, Share & Trends Analysis Report By Event Type, By Service, By Establishment Size, By End User, By Application, By Industry Vertical, By Use Case, And By Region, And Segment Forecasts, 2022-2030," Grand View Research, Accessed: Jan. 18, 2023, https://www.grandviewresearch.com/industry-analysis/virtual-events-market, 10 pages.
(Continued)

*Primary Examiner* — Moustafa M Meky
(74) *Attorney, Agent, or Firm* — Kristofer Haggerty

(57) ABSTRACT

A method, a structure, and a computer system for a conference operator. The exemplary embodiments may include extracting features from a conference of participants and determining whether a statement made by a first participant is directed to a second participant based on the features. The exemplary embodiments may further include, based on determining that the statement made by the first participant is directed to the second participant, determining whether the statement made by the first participant is part of a subconference and, based on determining that the statement made by the first participant is part of the subconference, emphasizing media corresponding to the subconference while deemphasizing media corresponding to the conference.

20 Claims, 3 Drawing Sheets

(51) Int. Cl.
H04L 65/401 (2022.01)
H04L 65/403 (2022.01)

(58) Field of Classification Search
USPC ......................................................... 209/224
See application file for complete search history.

(56) References Cited

U.S. PATENT DOCUMENTS

| | | | |
|---|---|---|---|
| 7,885,396 B2 | 2/2011 | Liang | |
| 8,676,913 B1 * | 3/2014 | Roche .................... | G06Q 10/40 |
| | | | 709/206 |
| 8,793,324 B1 * | 7/2014 | Schabes ................ | G06Q 10/40 |
| | | | 709/206 |
| 9,683,884 B2 | 6/2017 | Cohen | |
| 10,110,523 B2 * | 10/2018 | Badge .................. | H04L 51/046 |
| 10,268,340 B2 * | 4/2019 | Chen .................... | G06Q 10/107 |
| 10,572,005 B2 | 2/2020 | Zahn | |
| 10,684,746 B2 * | 6/2020 | Chen .................... | G06Q 10/107 |
| 10,757,050 B2 * | 8/2020 | Badge .................. | H04L 51/046 |
| 11,647,123 B2 * | 5/2023 | Glisic .................. | H04L 65/403 |
| | | | 709/204 |
| 11,973,901 B2 * | 4/2024 | Glisic ................. | H04L 65/4046 |

| | | | |
|---|---|---|---|
| 2008/0226087 A1 | 9/2008 | Kinghorn | |
| 2015/0074194 A1 * | 3/2015 | Schabes ................ | G06Q 10/40 |
| | | | 709/204 |
| 2016/0088259 A1 | 3/2016 | Anderson | |
| 2016/0241494 A1 * | 8/2016 | Badge .................. | H04L 51/046 |
| 2019/0036854 A1 * | 1/2019 | Badge .................. | H04L 51/046 |
| 2019/0155459 A1 * | 5/2019 | Chen .................... | G06Q 10/107 |
| 2020/0044996 A1 * | 2/2020 | Johnson ................ | H04L 51/046 |
| 2023/0239408 A1 * | 7/2023 | Glisic .................. | H04L 65/403 |
| | | | 709/204 |
| 2025/0133270 A1 * | 4/2025 | Edwards ............. | G06F 16/9035 |

OTHER PUBLICATIONS

IBM, "IBM Video Streaming," Accessed: Jan. 18, 2023, https://www.ibm.com/products/video-streaming, 5 pages.
IBM, "IBM Watson Media Support Center," Accessed: Jan. 18, 2023, https://support.video.ibm.com/hc/en-us, 4 pages.
IBM, "Let's create something that changes everything," Accessed: Jan. 18, 2023, https://www.ibm.com/strategic-partnerships?lnk=fab, 14 pages.
IBM, "Streaming Video Blog," IBM Watson Media, Accessed: Jan. 18, 2023, https://blog.video.ibm.com/, 15 pages.

* cited by examiner

Figure 1:
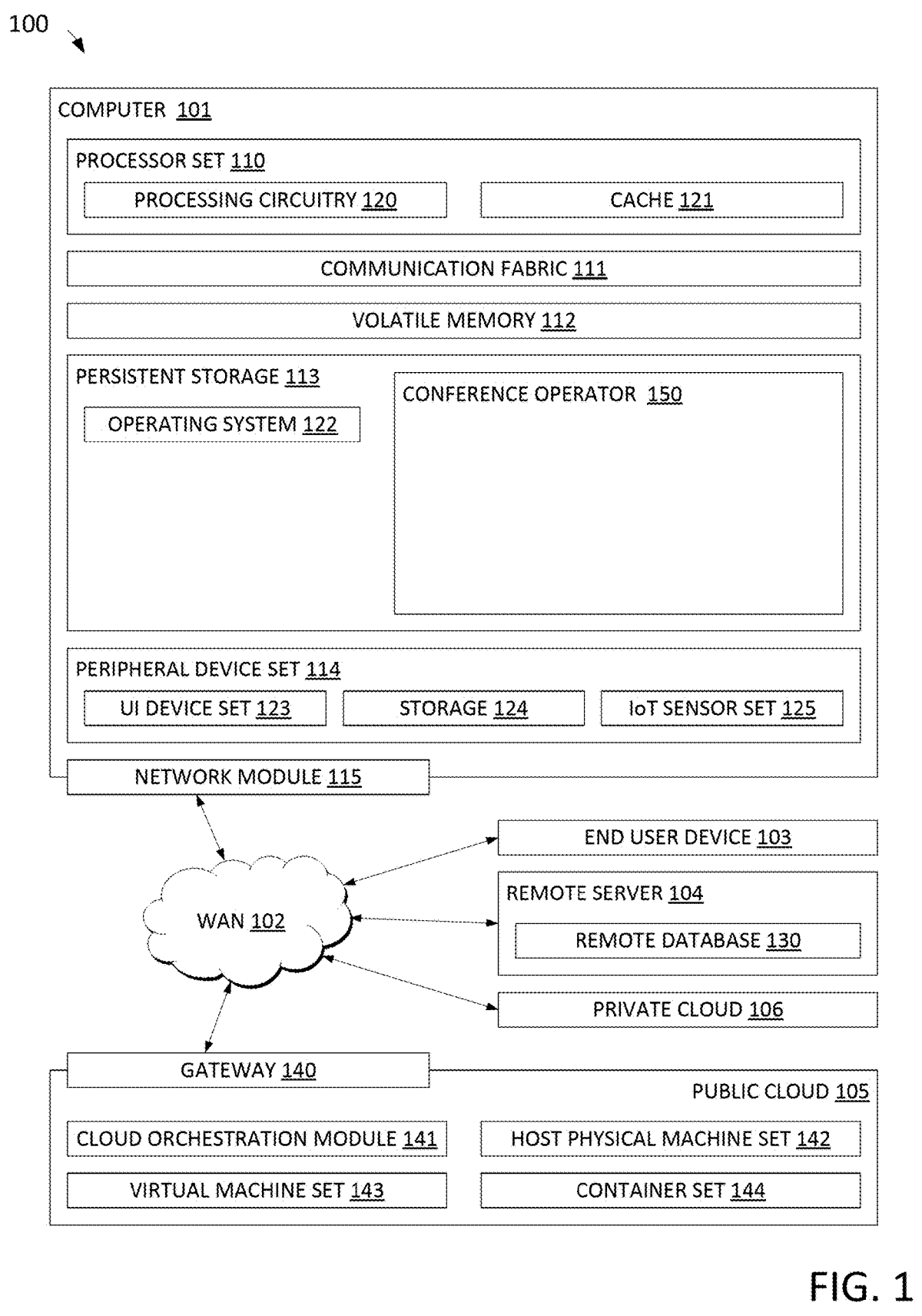

100

COMPUTER  101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

CONFERENCE OPERATOR  150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

CONFERENCE OPERATOR

BACKGROUND

The exemplary embodiments relate generally to software technology, and more particularly to virtual conferencing.

There are subtle drawbacks to hosting a virtual conference in lieu of an in-person conference, including reduced visual feedback, reduced auditory feedback, and an inability to host subconferences. Although these drawbacks often result in an overall less personable virtual conference experience, there is currently no way to mimic these experiences within a virtual conference. These drawbacks may additionally reduce conference fluidity and productivity, or worse lead to miscommunication and confusion.

SUMMARY

The exemplary embodiments disclose a method, a structure, and a computer system for a conference operator. The exemplary embodiments may include extracting features from a conference of participants and determining whether a statement made by a first participant is directed to a second participant based on the features. The exemplary embodiments may further include, based on determining that the statement made by the first participant is directed to the second participant, determining whether the statement made by the first participant is part of a subconference and, based on determining that the statement made by the first participant is part of the subconference, emphasizing media corresponding to the subconference while deemphasizing media corresponding to the conference.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which:

FIG. 1 depicts an exemplary block diagram depicting the components of computing environment 100, in accordance with the exemplary embodiments.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION

Figure 2:
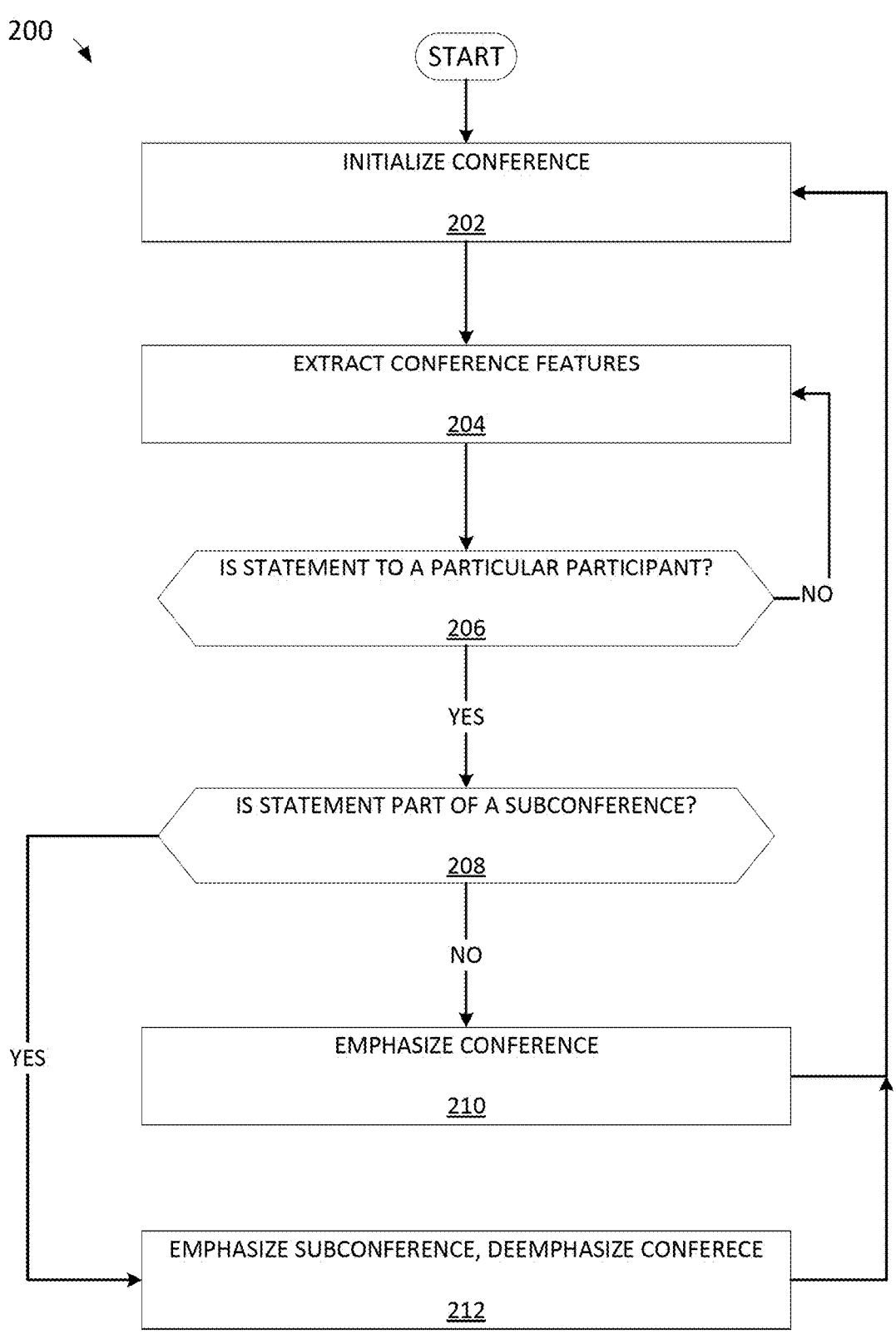
FIG. 2 depicts an exemplary flowchart 200 illustrating operations of conference operator 150 of computing environment 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

There are subtle drawbacks to hosting a virtual conference in lieu of an in-person conference, including reduced visual feedback, reduced auditory feedback, and an inability to host subconferences. Although these drawbacks often result in an overall less personable virtual conference experience, there is currently no way to mimic these experiences within a virtual conference. These drawbacks may additionally reduce conference fluidity and productivity, or worse lead to miscommunication or confusion.

The present invention improves upon the drawbacks within the field of virtual conferencing outlined above in at least several ways. First, the present invention allows a speaker within a conference to emphasize statements made directly to a specific participant or group thereof. This allows for closer mimicking of an in-person meeting where a host may be directing a particular message, task, or thanks to a particular participant through visual and/or auditory feedback, such as maintaining eye contact or a change in tone or volume. The participant(s) to whom the statement is directed within the virtual conference may correspondingly receive a visual and/or audial notification on their client device.

In addition, the present invention may further allow for two or more participants to participate in a concurrent subconference within the greater conference, again mimicking an in-person meeting where side conversations may be held simultaneous to the conference. The invention may modulate audio for participants of the side conversation such that the side conversation is emphasized, for example via increased side conversation playback volume, camera views, etc., while the media corresponding to the greater conference is played in the background, muted, etc.

FIG. 1 depicts an exemplary block diagram depicting the components of computing environment 100, in accordance with the exemplary embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as conference operator 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user, and may take any of the forms discussed above with respect to computer 101. The EUD 103 may further include any components described with respect to computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts an exemplary flowchart 200 illustrating the operations of conference operator 150 of computing environment 100, in accordance with the exemplary embodiments.

Virtual conferencing platforms may connect participants to a virtual conference via one or more media steams. Media streams may be transmitted within a virtual conference via network packets traveling through a network and channels thereof, such as the internet. In embodiments, conference operator 150 may act as an operator to the participants of a conference and as such is capable of emphasizing and/or deemphasizing media streams thereof. For example, conference operator 150 may emphasize media streams from a host to participant, or from a participant to another participant while deemphasizing media streams from the host. Conference operator 150 may be installed by virtual conference participants on their devices as clients in a client-server model where conference operator 150 is executed primarily from the server side. Herein, the operations of conference operator 150 are described from the server side unless noted otherwise. In embodiments, conference operator 150 may include or be integrated with existing virtual conferencing platforms capable of connecting two or more participants via media streams within a virtual conference. The operations of conference operator 150 are now described in greater detail.

Conference operator 150 may initialize a virtual conference (step 202). As previously noted, conference operator 150 may be installed as clients on conference participant devices under client-server models in which media streams are passed between clients and the hosting server. Conference operator 150 may identify the start of a virtual conference via communication with the client and may initially collect client device information such as device internet protocol (IP) address, media access control (MAC) address, etc., via communication with client device operating systems. Conference operator 150 may additionally measure a baseline quality of service (QoS) corresponding to the identified network connections between the server and the clients under TCP/UDP data transfer protocols. The quality of service may be determined from network packet traffic and quantify metrics such as packet loss, bit rate, throughput, transmission delay, availability, jitter, etc.

Conference operator 150 may additionally extract features relating to conference time, date, participants, topics, agenda, materials, and other features extractable from the conference information currently available. Conference operator 150 may extract such information by analysing (e.g., NLP) resources such as schedules, repositories (e.g., digital document sharing, project management boards, employee repositories, etc.), user inputs, and the like. Conference operator 150 may store the extracted conference information in association with the time and date of the conference while storing participant information within participant profiles associated with participants. The participant profiles may store, for example, a participant name, username, job title, company, expertise, experience, location, projects on which they are working, picture, voiceprint, etc. Thus, for a given virtual conference, conference operator 150 may extract preliminary data relating to the conference and data relating to the one or more participants thereof.

Figure 3A:
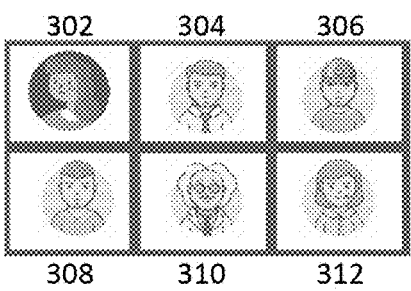
FIG. 3A-D depicts an illustration of the application of the present invention, in accordance with the exemplary embodiments.

To better illustrate the operations of conference operator 150, reference is now made to an illustrative example depicted by FIG. 3A wherein conference operator 150 initializes a conference between participants 302, 304, 306, 308, 310, and 312. Conference operator 150 initially extracts preliminary features such as conference topic, participant name, and participant expertise.

Conference operator 150 may extract conference features (step 204). In addition to extracting preliminary features during initialization (e.g., topics, participants, etc.), conference operator 150 may extract additional features once the virtual conference has begun. Conference operator 150 may extract features from data corresponding to conference audio (e.g., participant audio streams), conference video (e.g., participant video streams), and materials presented during the conference (e.g., pictures, tables/charts, screen shares, media clips, etc.). Conference operator 150 may then extract features from the data by applying various techniques.

Features extracted from conference video streams may include participant eye gaze as determined via eye gaze detection, participant gestures via gesture detection, images via image classification (e.g., convolutional neural networks), text via optical character recognition, etc. Features extracted from audio streams may include text transcribed from participant speech, participant tone via tone analysis, participant sentiment via sentiment analysis, etc. Conference operator 150 may apply natural language processing techniques to the transcribed, recognized, or otherwise extracted text. The NLP may include named entity recognition techniques to determine whether a statement includes a named entity such as a person, place, or company, as well as negation detection, hypothetical detection, and disambiguation analysis. Conference operator 150 may additionally extract a mapping of participant screens via screen mapping. The screen mapping provides relative locations of the features within a screen of a participant, for example relative locations of participant video streams or materials. Conference operator 150 may further correlate an eye gaze direction with the screen mapping temporally and spatially such that a focus of the participant may be deduced.

Figure 3B:
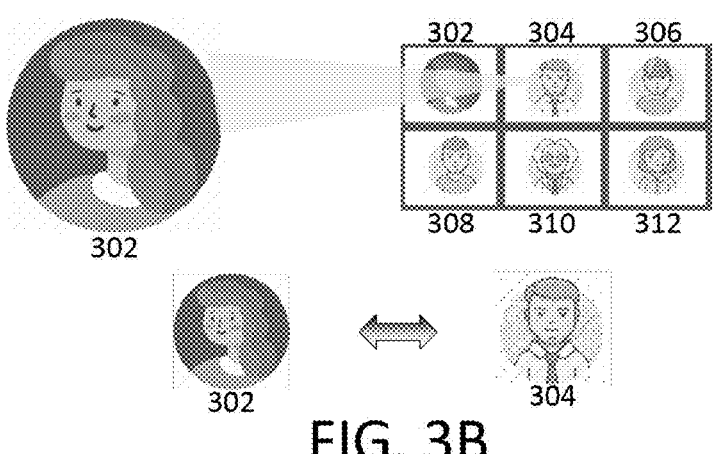

Furthering the illustrative example introduced above and with reference to FIG. 3B, conference operator 150 extracts conference features corresponding to speaking participant 302, including corresponding speech, a topic of the speech, eye gaze direction, and a screen mapping.

Conference operator 150 may determine whether a statement is directed to a particular participant (decision 206). In embodiments, conference operator 150 may determine whether a statement is directed to a particular participant via analysis of the extracted features. Such an analysis may be, for example, rule-based, machine learned, a combination thereof, etc.

In a rule-based analysis, conference operator 150 may be configured to perform an if-then analysis where, if one or more rules are satisfied, then an action is executed. In such embodiments, conference operator 150 may be configured with rules that may determine, for example, whether a named entity extracted from participant speech matches that of a fellow participant, or whether a topic of discussion match an expertise of a fellow participant. Depending on a configuration, satisfying either or both of the rules may determine whether a corresponding statement is or isn't directed to a particular participant.

Moreover, conference operator 150 may determine whether the statement is directed to a particular participant using a machine learning analysis. In a machine learning analysis, conference operator 150 may train a model based on historical training data that includes input features and output values. During training, the model generates one or more algorithms that quantify a relationship between the input features and the output variables, applying weights to the features in accordance with their determined impact on accurately modelling the relationship. Post training, the model may then apply the identified weights to a new set of input features in order to predict an unknown output. The model may be additionally tuned (e.g., weighting adjustments) via back propagation, for example using a feedback loop indicative of correct or incorrect output values.

Here, conference operator 150 may train a model correlating the one or more features described above with outputs labelled as correctly or incorrectly identifying when a statement is directed to a particular participant. Conference operator 150 may assign weights to the features based on historical importance identified within the training data such that when applied to a new set of input features the historical importance is applied. The output may then indicate a probability score predictive as to whether a statement is directed to a particular participant.

Using either or both of a rule-based and machine learning-based system, conference operator 150 may determine whether a statement is directed to a particular participant. Conference operator 150 may be configured to perform the analysis for any or all participants to a conference and analysis results may be ranked by participant. In a rule-based analysis, for example, conference operator 150 may rank participants based on whether they satisfy the rules or how many rules they satisfy. In a machine-learned analysis, conference operator 150 may rank participants based on a relative probability score output by the model. As needed, conference operator 150 may utilize similarity metrics and thresholds when making comparisons, for example when determining whether a named entity transcribed from speech matches or substantially matches the name of a participant.

The present invention appreciates that a statement may be directed to a group of participants, and therefore conference operator 150 may be configured in several manners to select multiple participants to which the statement is most likely directed. Conference operator 150 may be configured to select one or more participants having a highest relative likelihood, for example, satisfies the most rules or has a highest probability score. Alternatively, conference operator 150 may be configured to select one or more participants having a likelihood higher than a specific relative or absolute threshold, for example all participants satisfying a threshold number of rules or exceeding a threshold probability.

In the aforementioned example and with reference to FIG. 3B, conference operator 150 analyses the features extracted from the conference such as the participant names, participant expertise, topic of the speech, the eye gaze direction, and the screen mapping corresponding to participant 302.

If conference operator 150 determines that the statement is not directed to a particular participant (decision 206, "NO" branch), then conference operator 150 may continue to extract conference features (step 204) without modification to media streams of participants. Here, because no particular participant is a focus of the statement, conference operator 150 may continue to transmit the media stream by default to all participants.

Accordingly, in the formerly introduced example, if conference operator 150 determines that the statement is not directed toward any particular participant, then conference operator 150 makes no modification to virtual conference media streams of any participants and continues to extract conference data.

Alternatively, if conference operator 150 determines that the statement is directed to a particular participant (decision 206, "YES" branch), then conference operator 150 may determine whether the statement is part of a subconference (decision 208). A subconference is a side discussion between two or more participants of the conference that is in addition to the existing conference discussion. Because a subconference adds additional media streams to the conference, for example additional speaking participants, conference operator 150 determines which media streams to emphasize to which participants such that the conference is not derailed by participants speaking over one another or waiting on others to finish.

In embodiments, conference operator 150 may determine whether the statement is part of a subconference by first determining whether the statement is one of two or more concurrently made statements, i.e., does a subconference exist. Whether in monologue or conversation, conferences generally have only one concurrent speaker and the subsequent detection of a second concurrent speaker may be indicative of the existence of a subconference. To capture this concept, conference operator 150 may identify speaking participants that are first in time as speaking to the conference while identifying interrupting participants as speaking to a subconference. Thus, if multiple speakers are detected, conference operator 150 determines whether the statement directed to the particular participant was the existing statement (i.e., part of the conference) or the interrupting statement (i.e., part of subconference). In order to determine whether a statement is existing or interrupting, conference operator 150 may be configured to first determine the beginnings and ends of statements based on, for example, identifying pauses within speech, change in voiceprint, etc. Conference operator 150 may then determine whether the statement directed to the particular participant is made prior to or following the end of the existing statement; with the former case identified as an interruption directed to a subconference and the latter case identified as the existing statement to the conference.

In the example introduced above and with reference to FIG. 3B, if conference operator 150 determines that participant 302 directs a statement towards participant 304, then conference operator 150 determines whether the statement is part of a subconference by determining whether the statement is interrupting other statements within the virtual conference.

If conference operator 150 determines that the statement is not part of a subconference (decision 208, "NO" branch), then conference operator 150 may emphasize the conference media (step 212). In determining that the statement is not part of a subconference, conference operator 150 instead determines that the statement is made by a speaker within the conference, and therefore emphasizes media from the conference. Conference operator 150 may emphasize the audio portion of the media by modulating audio of the statement, playing a notification sound prior to, during, and/or after the statement, etc. For example, conference operator 150 may change a volume or amplitude/frequency of a statement at the client of the particular participant that the statement is directed to. In addition, conference operator 150 may dub a chime or sound at the client device of the particular participant indicating that a statement is directed to them. With respect to visual emphasis at the client device, conference operator 150 may modify a size of a video stream or shared media, change a zoom, overlay indicators on the display, move or flash objects, etc. For example, conference operator 150 may increase the size of (e.g., 2×, full-screen) a video stream of the participant making the statement on a display of the participant to which it is directed. Conference operator 150 may be configured to emphasize the media stream for the duration during which the statement is made or for portions thereof. In embodiments, conference operator 150 may be configured to mute media streams of any additional conferences/subconferences outside of that which is currently emphasized, creating an insulated subconference within the conference.

Referring again to the example depicted by FIG. 3B, if conference operator 150 determines that the statement made by participant 302 is not part of a subconference, then conference operator 150 emphasizes media associated with the conference and statement at a client device of participant 304, such as increasing a video stream size corresponding to participant 302 and playing a notification chime.

Alternatively, if conference operator 150 determines that the statement is part of a subconference (decision 208, "YES" branch), then conference operator 150 may emphasize the media within the subconference while deemphasizing the media within the conference (step 210). Conference operator 150 may emphasize media corresponding to the subconference in a similar manner to that described above. In addition, conference operator 150 may emphasize the subconference for any other participants identified for the subconference in a similar manner. Furthermore, conference operator 150 may deemphasize media streams of the conference and host in favor of the side conversation. Deemphasizing media may include reducing a volume of audio, size of video, removal entirely, etc. In yet further embodiments, conference operator 150 may create a side communication channel for the side conversation that mutes streams to and from participants not participating in the side conversation. Participants may be further capable of swapping emphasis between conference and subconferences as needed.

Figure 3C:
Figure 3D:
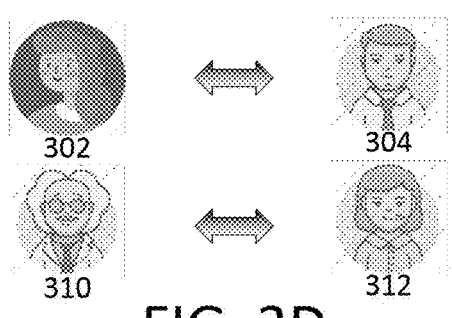

Concluding the example depicted by FIG. 3A-D, and with particular reference to FIG. 3C, if conference operator 150 determines that the statement is instead from participant 310 directed towards participant 312, conference operator 150 emphasizes the media from participant 310 for participant 312 and vice versa within a subconference by, for example, increasing a volume associated with the participants and corresponding video stream sizes. In addition, conference operator 150 may deemphasize media from participant 302 within the main conference by, for example, decreasing an audio volume and removing their corresponding video stream. The resulting conference may now have two simultaneous discussions without disturbing each other as shown in FIG. 3D.

In embodiments, participants of the conference may configure conference operator 150 to automatically emphasize media as described herein, however conference operator 150 may be additionally configured to require participant approval or consent prior to modifying incoming and outgoing media streams. In the example depicted by FIG. 3A-D, for instance, participant 312 may prefer to maintain emphasis on the statements made by participant 302 as part of the greater conference rather than focus on a statement made by participant 310 in a subconference. Accordingly, participant 310 may decline the request to participate in the subconference or modify the terms under which they join via user input. Conference operator 150 may, for example, be configured to provide participants settings corresponding to conference and subconference media that allows them to manually adjust volume, size, position, etc. of the media streams.

FIG. 3A-D depicts an illustration of the application of the present invention, in accordance with the exemplary embodiments.

What is claimed is:

1. A method for a conference operator, the method comprising:
   extracting features from a conference of participants;
   determining whether a statement made by a first participant is directed to a second participant based on the features;
   based on determining that the statement made by the first participant is directed to the second participant, determining whether the statement made by the first participant is part of a subconference; and
   based on determining that the statement made by the first participant is part of the subconference, emphasizing media corresponding to the subconference while deemphasizing media corresponding to the conference.

2. The method of claim 1, further comprising:
   based on determining that the statement is not part of a subconference, emphasizing media corresponding to the conference.

3. The method of claim 1, wherein the features include participant speech, participant name, participant expertise, participant eye gaze, participant screen mapping, and conference topic.

4. The method of claim 3, wherein the determining whether the statement made by the first participant is directed towards the second participant based on the features further comprises:
   training a model that correlates the features to the participants; and
   applying the model to the features.

5. The method of claim 1, wherein the determining whether the statement is part of the subconference further comprises:
   identifying statements made throughout the conference;
   determining whether the statement made by the first participant interrupts at least one of the statements; and
   based on determining that the statement made by the first participant interrupts the at least one of the statements, identifying the statement made by the first participant as part of the subconference.

6. The method of claim 1, wherein the emphasizing the media is selected from a group consisting of modulating an audio volume, modifying a size of a video, modifying a zoom of a video, and playing an audible chime.

7. The method of claim 1, wherein participation within the conference and the subconference may be modified by the second participant.

8. A computer program product for a conference operator, the computer program product comprising:

one or more non-transitory computer-readable storage media and program instructions stored on the one or more non-transitory computer-readable storage media capable of performing a method, the method comprising:

extracting features from a conference of participants;

determining whether a statement made by a first participant is directed to a second participant based on the features;

based on determining that the statement made by the first participant is directed to the second participant, determining whether the statement made by the first participant is part of a subconference; and based on determining that the statement made by the first participant is part of the subconference, emphasizing media corresponding to the subconference while deemphasizing media corresponding to the conference.

9. The computer program product of claim 8, further comprising:

based on determining that the statement is not part of a subconference, emphasizing media corresponding to the conference.

10. The computer program product of claim 8, wherein the features include participant speech, participant name, participant expertise, participant eye gaze, participant screen mapping, and conference topic.

11. The computer program product of claim 10, wherein the determining whether the statement made by the first participant is directed towards the second participant based on the features further comprises:

training a model that correlates the features to the participants; and applying the model to the features.

12. The computer program product of claim 8, wherein the determining whether the statement is part of the subconference further comprises:

identifying statements made throughout the conference;

determining whether the statement made by the first participant interrupts at least one of the statements; and based on determining that the statement made by the first participant interrupts the at least one of the statements, identifying the statement made by the first participant as part of the subconference.

13. The computer program product of claim 8, wherein the emphasizing the media is selected from a group consisting of modulating an audio volume, modifying a size of a video, modifying a zoom of a video, and playing an audible chime.

14. The computer program product of claim 8, wherein participation within the conference and the subconference may be modified by the second participant.

15. A computer system for a conference operator, the system comprising:

one or more computer processors, one or more computer-readable storage media, and program instructions stored on the one or more of the computer-readable storage media for execution by at least one of the one or more processors capable of performing a method, the method comprising:

extracting features from a conference of participants;

determining whether a statement made by a first participant is directed to a second participant based on the features;

based on determining that the statement made by the first participant is directed to the second participant, determining whether the statement made by the first participant is part of a subconference; and based on determining that the statement made by the first participant is part of the subconference, emphasizing media corresponding to the subconference while deemphasizing media corresponding to the conference.

16. The computer system of claim 15, further comprising:

based on determining that the statement is not part of a subconference, emphasizing media corresponding to the conference.

17. The computer system of claim 15, wherein the features include participant speech, participant name, participant expertise, participant eye gaze, participant screen mapping, and conference topic.

18. The computer system of claim 17, wherein the determining whether the statement made by the first participant is directed towards the second participant based on the features further comprises:

training a model that correlates the features to the participants; and applying the model to the features.

19. The computer system of claim 15, wherein the determining whether the statement is part of the subconference further comprises:

identifying statements made throughout the conference;

determining whether the statement made by the first participant interrupts at least one of the statements; and based on determining that the statement made by the first participant interrupts the at least one of the statements, identifying the statement made by the first participant as part of the subconference.

20. The computer system of claim 15, wherein the emphasizing the media is selected from a group consisting of modulating an audio volume, modifying a size of a video, modifying a zoom of a video, and playing an audible chime.

* * * * *